United States Patent [19]
Lin

[11] Patent Number: 5,542,770
[45] Date of Patent: Aug. 6, 1996

[54] MULTIFUNCTIONAL MICROPOCESSOR INPUT DEVICE

[76] Inventor: Meng H. Lin, 4F, No. 23, Lane 306, Fu Teh 1st Road, Hsi Chih, Taipei Hsien, Taiwan

[21] Appl. No.: 199,822

[22] Filed: Feb. 22, 1994

[51] Int. Cl.⁶ .................................................. B41J 5/08
[52] U.S. Cl. .......................... 400/477; 400/485; 341/23; 345/171
[58] Field of Search .................................. 400/477, 478, 400/484, 485; 341/22, 23, 28; 345/168, 171, 172; 364/189

[56] References Cited

U.S. PATENT DOCUMENTS

| | | | |
|---|---|---|---|
| 3,394,368 | 7/1968 | Carr et al. | 341/23 |
| 4,279,021 | 7/1981 | See et al. | 341/23 |
| 4,336,530 | 6/1982 | Koike et al. | 400/493 |
| 4,855,746 | 8/1989 | Stacy | 341/23 |
| 5,387,042 | 2/1995 | Brown | 400/477 |

FOREIGN PATENT DOCUMENTS 55-072234  5/1980  Japan .................................. 345/172

*Primary Examiner*—David A. Wiecking
*Attorney, Agent, or Firm*—Thomas R. Vigil

[57] ABSTRACT

A multifunctional microprocessor device includes a mainframe, a lower slide plate made to slide on the mainframe in the transverse direction and having a forked contact metal spring inserted through a first through hole on the mainframe and series of longitudinally aligned windows to show character codes around the keys on the mainframe, an upper slide plate made to slide on the mainframe in the longitudinal direction and having a forked contact metal spring inserted through a second through hole on the mainframe and series of transversely aligned windows to show character codes around the keys on the mainframe, wherein moving the upper and/or lower slide plates longitudinally or transversely causes the forked contact metal spring of either slide plate to contact either contact on the electronic circuit of the mainframe, and therefore the microprocessor unit is switched to the function modes corresponding to the character codes shown through the windows on the upper and lower slide plates.

5 Claims, 3 Drawing Sheets

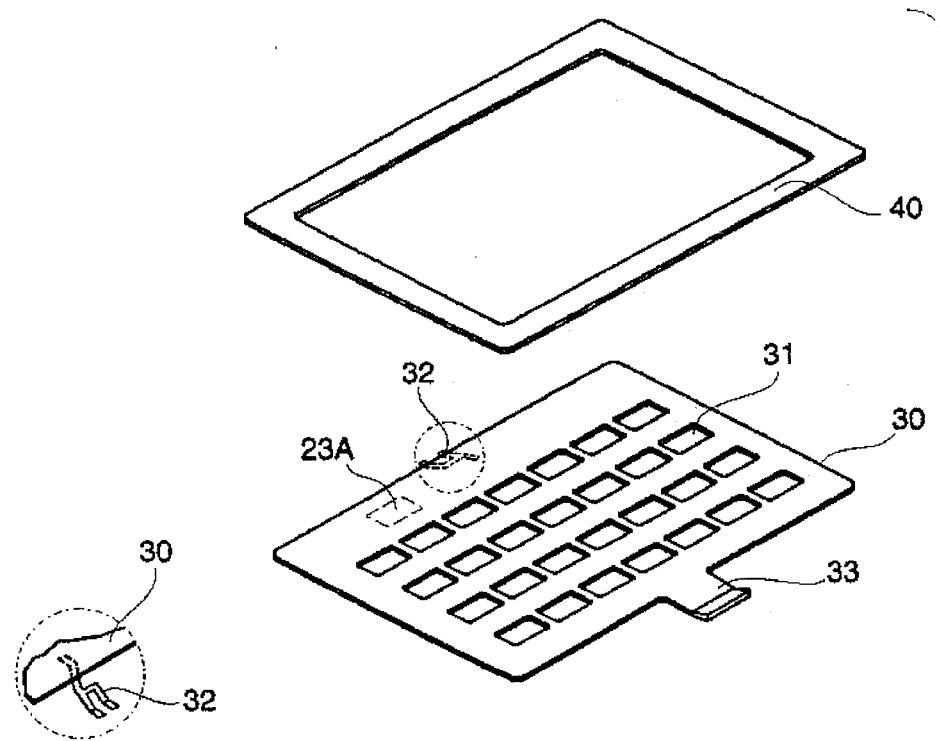
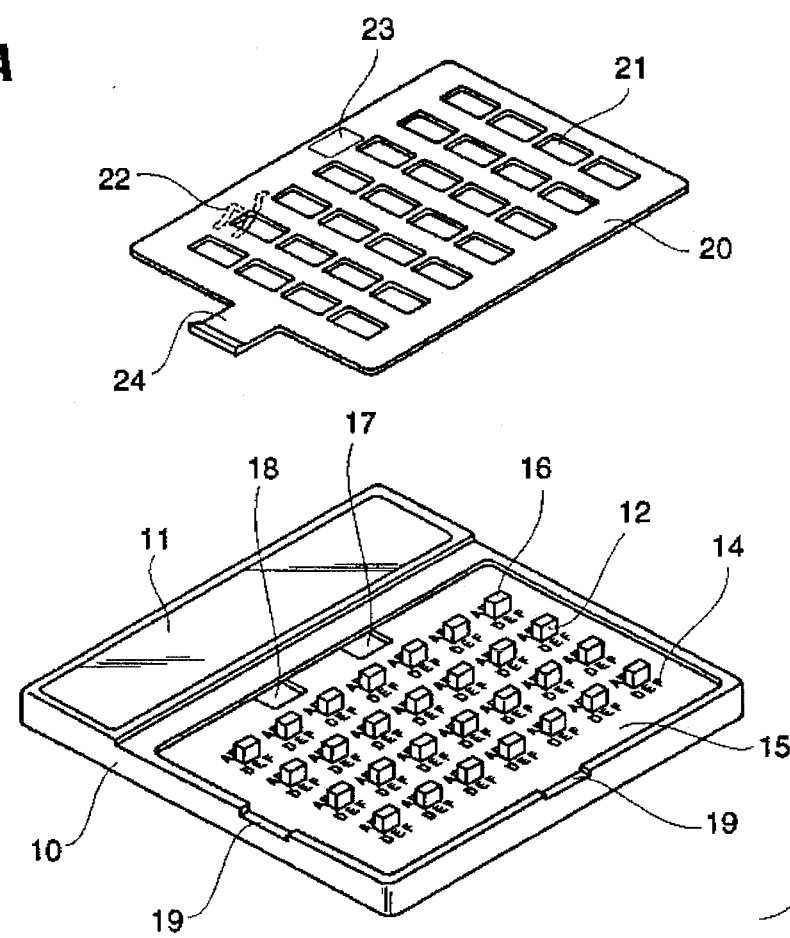
FIG. 1A
FIG. 1

MULTIFUNCTIONAL MICROPOCESSOR INPUT DEVICE

BACKGROUND OF THE INVENTION

The present invention relates to a multifunctional microprocessor device which has slide plates that are alternatively moved in the longitudinal or transverse direction to show different character codes through respective windows thereof and simultaneously to switch the device to different function modes.

Regular multifunctional microprocessor devices such as electronic dictionaries, translators, commonly provide several operational functions including the function of translating words and sentences from English to Chinese or from Chinese to English, the function of a calculator, etc. In order to match with different function modes, two or more character codes are engraved or printed on each key at the top for a respective input operation. Therefore, the user must select the desired function mode through functional keys and operate the operation keys according to corresponding character codes being made on the operation keys. However, when several character codes are closely made on each operation key, the user shall have to spend a substantial amount of time in finding the character codes to be inputted, and errors may be made easily during the operation. There is a type of microprocessor device having operation keys comprising of a respective LCD element which shows a respective character code corresponding to the selected function mode. When the microprocessor device is switched from one function mode to another, the character code displayed on the LCD element of each operation key is changed correspondingly. Because LCD elements are expensive, this type of microprocessor device is not widely accepted.

SUMMARY OF THE INVENTION

The present invention has been accomplished under the aforesaid circumstances. It is therefore one object of the present invention to provide a multifunctional microprocessor device which comprises two slide plates covered on the face panel of the mainframe thereof one above the other and moved to conceal the character codes not to be used and to show only the character codes corresponding to the function mode been selected. It is another object of the present invention to provide a multifunctional microprocessor device in which the slide plates have a respective forked contact metal spring inserted through a respective hole on the mainframe and moved to switch the microprocessor device to the desired function mode when corresponding character codes are respectively shown around the keys.

BRIEF DESCRIPTION OF THE DRAWINGS

The present invention will now be described by way of example with reference to the annexed drawings, in which:

FIG. 1 is an exploded view of a multifunctional microprocessor device according to the preferred embodiment of the present invention;

FIG. 1A is an enlarged view of the forked contact metal spring attached to the slide plate shown in FIG. 1.

DETAILED DESCRIPTION OF THE PREFERRED EMBODIMENT

Figure 2:
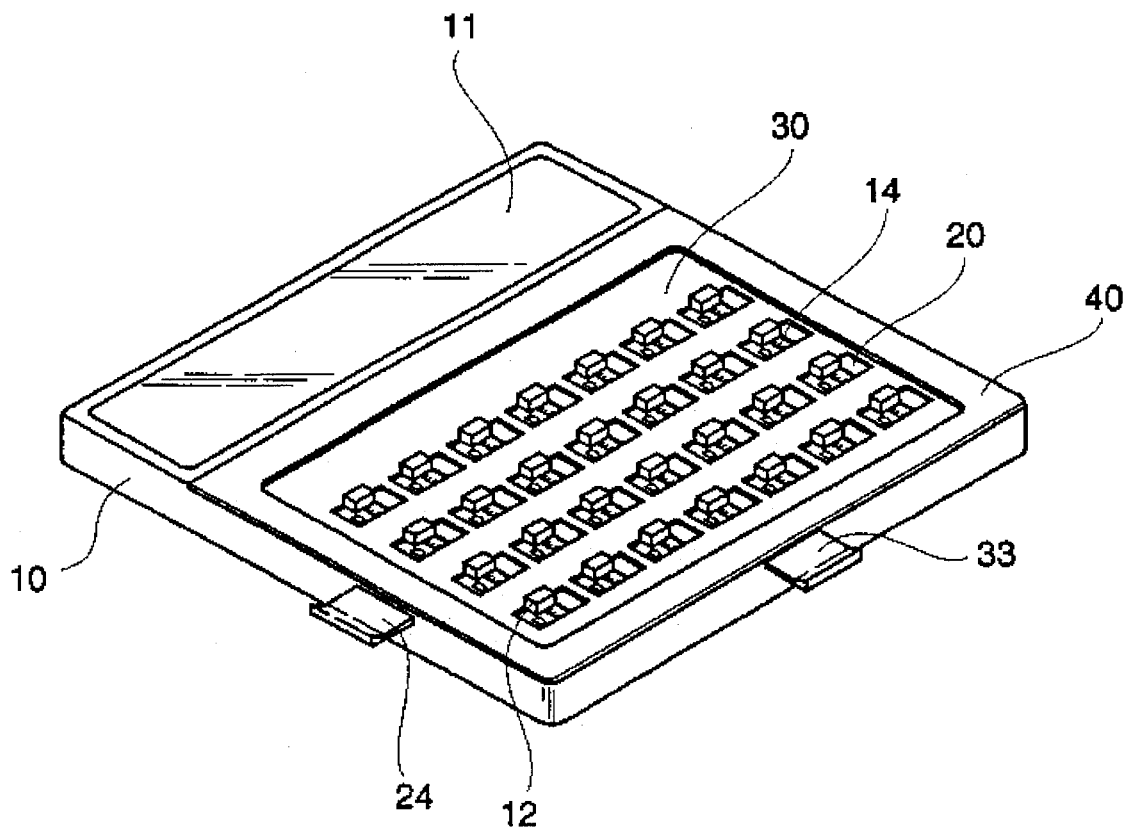
FIG. 2 is an elevational view of the multifunctional microprocessor device shown in FIG. 1.

Referring to FIGS. 1 and 2, a multifunctional microprocessor device in accordance with the preferred embodiment of the present invention is generally comprised of a mainframe 10, a lower slide plate 20, an upper slide plate 30, and a cover frame 40. The cover frame 40 is fastened to the mainframe 10 at the top to hold the lower slide plate 20 and the upper slide plate 30 to the face panel 15 of the mainframe 10. The mainframe 10 consists of a calculator or electronic dictionary having an LCD screen 11, a set of keys 12, and a circuit board 13 (see FIG. 3A). Character codes A, B, C, D, E, and F are engraved on the face panel 15 of the mainframe 10 around each key 12, i.e. they are not engraved on the top surface 16 of each key 12. These character codes represent different input functions, in which character code A represents the first input function (for example: Chinese Tsang Chieh input function); character code B represents the second input function (for example: English input function); character code C represents the third input function (for example: Chinese Phonetic input function); character code D represents the fourth input function (for example: engineering equation input function); character code E represents the fifth input function (for example: regular calculator input function); character code F represents the six input function (for example: engineering operation input function).

These six character codes are arranged on the face panel 15 of the mainframe 10 in such an order that character code B and character code E are respectively disposed at the top and bottom sides of each key 12; character codes A and C are disposed at two opposite sides of character code B; character codes D and F are respectively disposed at two opposite sides of character code C. The face panel 15 of the mainframe 10 comprises two through holes, namely, the first through hole 17 and the second through hole 18. The circuit board 13 comprises two longitudinally spaced contacts SW1;SW2 aligned with the first through hole 17 and two transversely spaced contacts SW3;SW4 aligned with the second through hole 18. By alternatively connecting the contacts SW1;SW2;SW3;SW4, four modes are alternatively provided (the switching of the modes will be explained further). Further, the face panel 15 of the mainframe is made recessed for holding the lower slide plate 20 and the upper slide plate 30. A first notch 19 and a second notch 19' are respectively made on the periphery of the face panel 15 at the left and bottom sides thereof.

The lower slide plate 20 is made of an opaque plate comprising series of longitudinally aligned windows 21 in number equal to the number of keys 12, a forked contact metal spring 22 inserted into the second through hole 18 and moved to contact contact SW3 or contact SW4, a through hole 23 aligned with the first through hole 17 on the face panel 15, a pull rod 24 extended out of the face panel 15 of the mainframe 10 through the first notch 19. Through the pull rod 24, the lower slide plate 20 can be moved back and forth in the transverse direction.

The upper slide plate 30 is made of an opaque plate comprising series of transversely aligned windows 31 in number equal to the keys 12, a forked contact metal spring 32 inserted into the first through hole 17 and moved to contact contact SW1 or contact SW2, a pull rod 33 extended out of the face panel 15 of the mainframe 10 through the second notch 19'. Through the pull rod 33, the upper slide plate 30 can be moved back and forth in the longitudinal direction.

One skilled in the art can readily appreciate that an alternative embodiment in which the upper and lower slide plates 30 and 20 are exchanged. Slide plate 30 would then be the bottom most slide plate. Slide plate 20 would then be the top most slide plate. This would result in a multifunctional microprocessor device whose top most slide plate can be moved back and forth in a transverse direction, and whose bottom most slide plate can be moved back and forth in a longitudinal direction. In this alternative embodiment, through hole 23, which is present on slide plate 20, would need to be present on slide plate 30 and be aligned with the second through hole 18 of mainframe 10. This is shown in FIG. 1 in phantom as through hole 23A on slide plate 30.

Figures 3, 3A, 4, 4A:
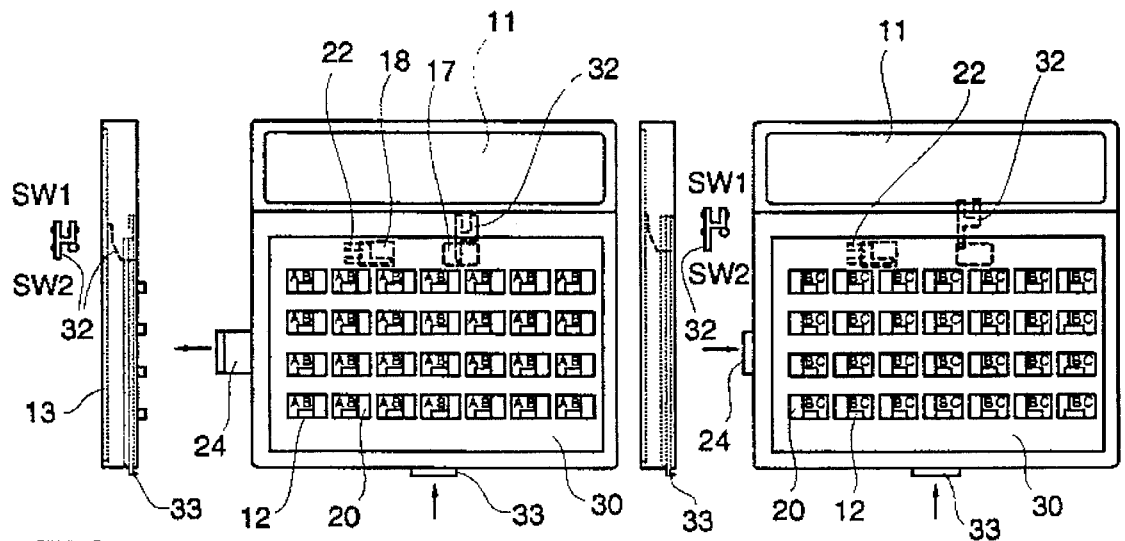
FIG. 3 shows the multifunctional microprocessor device switched to the first function mode.
FIG. 3A is an end view taken on FIG. 3 showing the positioning of the forked contact metal spring of the upper slide plate.
FIG. 4 shows the multifunctional microprocessor device switched to the second function mode.
FIG. 4A is an end view taken on FIG. 4 showing the positioning of the forked contact metal spring of the upper slide plate.
Figures 3B, 4B:
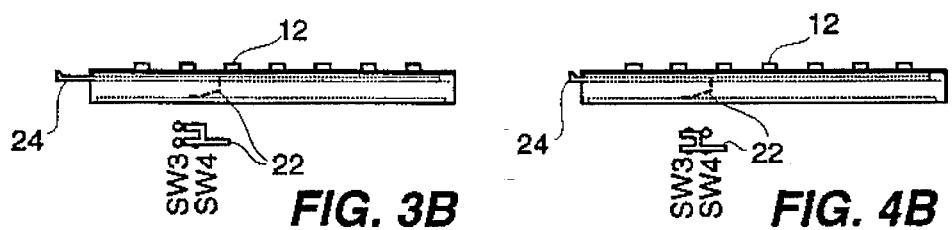
FIG. 3B is an end view taken on FIG. 3 showing the positioning of the forked contact metal spring of the lower slide plate.
FIG. 4B is an end view taken on FIG. 4 showing the positioning of the forked contact metal spring of the lower slide plate.
Figures 5, 6:
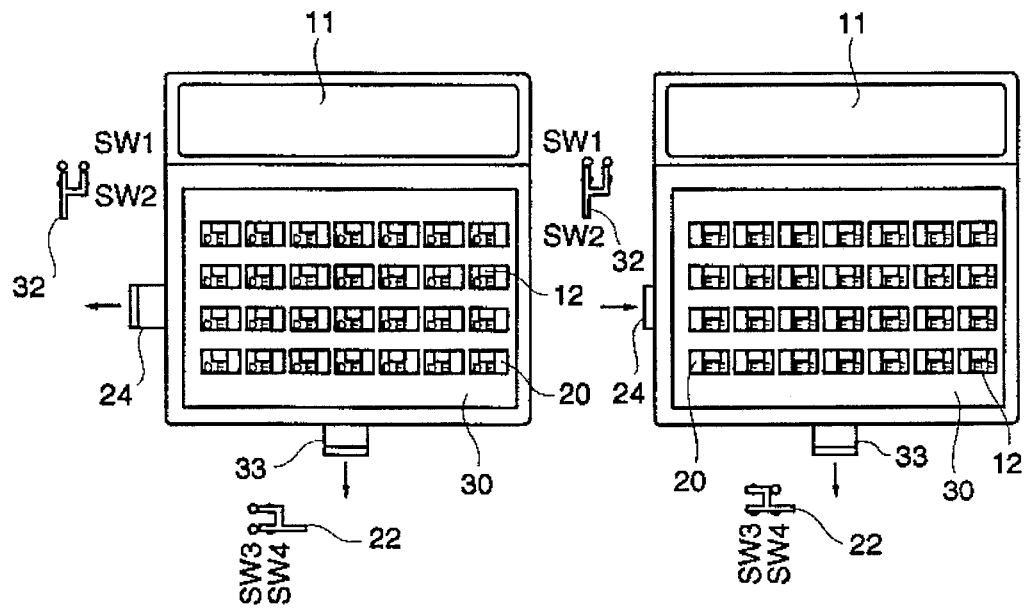
FIG. 5 shows the multifunctional microprocessor device switched to the third function mode.
FIG. 6 shows the multifunctional microprocessor device switched to the fourth function mode.

Referring to FIGS. 3 through 6, when the upper slide plate 30 is moved to the upper limit, the bottom edge of each window 31 of the upper slide plate 30 is respectively stopped at either key 12, causing the forked metal contact spring 32 of the upper slide plate 30 to contact contact SW1 (see FIG. 3A). If the lower slide plate 20 is moved to the left limit when the forked metal contact spring 32 contacts contact SW1, the forked metal contact spring 22 contacts contact SW3 (see FIG. 3B), and only character codes A and B are shown (see FIG. 3), and therefore the microprocessor device is switched to Chinese Tsang Chieh and English input modes for English input operation or Chinese Tsang Chieh input operation. If the lower slide plate 20 is moved to the right limit when the forked metal contact spring 32 contacts contact SW1, the forked metal contact spring 22 contacts contact SW4 (see FIG. 4B), and only character codes B and C are shown (see FIG. 3), and therefore the microprocessor device is switched to English and Chinese phonetic input modes for English input operation or Chinese phonetic input operation. If the upper slide plate 30 is moved to the lower limit when the forked metal contact spring 22 contacts contact SW3, the forked metal contact spring 32 contacts contact SW2, and only character codes D and E are shown (see FIG. 5), and therefore the microprocessor device is switched to engineering equation and regular calculator function modes for the operation of engineering equation or regular calculation. If the lower slide plate 20 is moved to the right limit when the forked metal contact spring 32 contacts contact SW2, the forked metal contact spring 22 contacts contact SW4, and only character codes E and F are shown (see FIG. 6), and therefore the microprocessor device is switched to the regular calculator and engineering operation function modes for engineering operation and regular calculation.

As described above, when the upper slide plate 30 and the lower slide plate 20 are moved in either direction, the forked metal contact springs 32; 22 alternatively contact the contacts SW1; SW2; SW3; SW4, and therefore the microprocessor device is switched to either of the four modes from the six sets of character codes.

It will be understood that various modifications and changes could be made without departing from the spirit and scope of the invention.

What is claimed is:

1. A multifunctional microprocessor device comprising:

a mainframe comprising a display screen, a recessed face panel having a first through hole, a set of keys mounted on said face panel, an electronic circuit having a first contact SW1 and a second contact SW2, and character codes made on said face panel around each key;

an open cover frame covered on said face panel of said mainframe;

a first slide plate retained to said face panel of said mainframe by said open cover frame and movable between a first limit position and a second lower limit position to alternatively show the character codes on said face panel, said first slide plate being made of an opaque plate, comprising a series of transversely aligned windows for showing said character codes alternatively and through which said keys project respectively, a first forked contact metal spring inserted into said first through hole and movable to alternatively contact said first contact SW1 and said second contact SW2; and wherein when said first slide plate is moved to said first limit position, said first forked contact metal spring contacts said first contact SW1 causing the multifunctional microprocessor device to switch to the function modes corresponding to the character codes shown through said series of transversely aligned windows of said first slide plate; when said first slide plate is moved to said second limit position, said first forked contact metal spring contacts said second contact SW2 causing the multifunctional microprocessor device to switch to the function modes corresponding to the character codes shown through said series of transversely aligned windows of said first slide plate.

2. The multifunctional microprocessor device of claim 1 wherein said display screen is a liquid crystal display screen.

3. The multifunctional microprocessor device of claim 1 further comprising a second slide plate disposed between said face panel and said first slide plate and alternatively movable between a third limit position and a fourth limit position, said second slide plate being made of an opaque plate and comprising a series of longitudinally aligned windows for showing said character codes alternatively and through which said keys project respectively, a second forked contact metal spring inserted into a second through hole on said face panel and movable to alternatively contact a third contact SW3 and a fourth contact SW4 of said electronic circuit, wherein when said second slide plate is moved to said third limit position, said second forked contact metal spring contacts said third contact SW3 causing the multifunctional microprocessor device to switch to the function modes corresponding to the character codes shown through said series of longitudinally aligned windows of said second slide plate; when said second slide plate is moved to said fourth limit position, said second forked contact metal spring contacts said fourth contact SW4 causing the multifunctional microprocessor device to switch to the function modes corresponding to the character codes shown through said series of longitudinally aligned windows of said second slide plate.

4. The multifunctional microprocessor device of claim 3 wherein said first slide plate is made to slide in the longitudinal direction and said second slide plate is made to slide in the transverse direction.

5. The multifunctional microprocessor device of claim 3 wherein said first slide plate is made to slide in the transverse direction and said second slide plate is made to slide in the longitudinal direction.

* * * * *